United States Patent
Barry et al.

(10) Patent No.: US 12,197,903 B2
(45) Date of Patent: Jan. 14, 2025

(54) VEHICLE CONTROLLER

(71) Applicant: JAGUAR LAND ROVER LIMITED, Coventry (GB)

(72) Inventors: Peter Barry, Limerick (IE); Javier Olarreta, Limerick (IE)

(73) Assignee: JAGUAR LAND ROVER LIMITED, Coventry (GB)

( * ) Notice: Subject to any disclaimer, the term of this patent is extended or adjusted under 35 U.S.C. 154(b) by 224 days.

(21) Appl. No.: 17/437,313

(22) PCT Filed: Mar. 6, 2020

(86) PCT No.: PCT/EP2020/056097
§ 371 (c)(1),
(2) Date: Sep. 8, 2021

(87) PCT Pub. No.: WO2020/182685
PCT Pub. Date: Sep. 17, 2020

(65) Prior Publication Data
US 2022/0179636 A1    Jun. 9, 2022

(30) Foreign Application Priority Data
Mar. 8, 2019 (GB) ...................................... 1903114

(51) Int. Cl.
*G06F 8/65* (2018.01)
*B60R 16/023* (2006.01)
*G06F 21/57* (2013.01)

(52) U.S. Cl.
CPC .............. *G06F 8/65* (2013.01); *B60R 16/023* (2013.01); *G06F 21/57* (2013.01); *G06F 2221/033* (2013.01)

(58) Field of Classification Search
CPC .......... G06F 8/65; G06F 21/57; B60R 16/023
(Continued)

(56) References Cited

U.S. PATENT DOCUMENTS

| 4,677,477 A | * | 6/1987 | Plut | H04N 5/32 378/98.2 |
| 10,991,242 B2 | * | 4/2021 | Taylor | H04Q 9/00 |

(Continued)

FOREIGN PATENT DOCUMENTS

EP    3214567 A1    9/2017

OTHER PUBLICATIONS

Nikitin, Kirill, et al. "CHAINIAC: Proactive Software-Update Transparency via Collectively Signed Skipchains and Verified Builds." USENIX Security Symposium. 2017.pp. 1271-1287 (Year: 2017).*

(Continued)

*Primary Examiner* — Satish Rampuria
(74) *Attorney, Agent, or Firm* — Reising Ethington P.C.

(57) ABSTRACT

The present disclosure relates to a verification controller for a vehicle, configured to receive data being sent over a data bus within the vehicle, detect software update data being sent to a control unit within the vehicle over the data bus, determine from the software update data a first security characteristic associated with an authentic version of the software update, generate a second security characteristic in dependence on the received software update data, determine if the second security characteristic is consistent with the first security characteristic, and output a first control signal for the control unit, the first control signal enabling installation of the software update on the control unit in dependence on the second security characteristic being consistent with the first security characteristic.

18 Claims, 6 Drawing Sheets

(58) Field of Classification Search
USPC .................................................. 717/120–178
See application file for complete search history.

(56) References Cited

U.S. PATENT DOCUMENTS

| | | | |
|---|---|---|---|
| 11,405,189 B1* | 8/2022 | Bennison | H04L 9/0656 |
| 11,445,362 B2* | 9/2022 | Liu | H04W 12/069 |
| 11,847,871 B2* | 12/2023 | Garrett | G07C 5/0841 |
| 2004/0069580 A1* | 4/2004 | Fleming | B60T 17/22 |
| | | | 188/265 |
| 2008/0286735 A1* | 11/2008 | Cusano | G09B 23/30 |
| | | | 434/267 |
| 2010/0023777 A1 | 1/2010 | Prevost et al. | |
| 2014/0164789 A1 | 6/2014 | Kaplan | |
| 2014/0297109 A1* | 10/2014 | Shimomura | H04L 67/125 |
| | | | 701/36 |
| 2016/0196131 A1 | 7/2016 | Searle et al. | |
| 2017/0010875 A1 | 1/2017 | Martinez et al. | |
| 2017/0180137 A1 | 6/2017 | Spanier et al. | |
| 2018/0011703 A1 | 1/2018 | Planche | |
| 2018/0048473 A1 | 2/2018 | Miller et al. | |
| 2018/0217828 A1* | 8/2018 | Madrid | H04L 63/123 |
| 2018/0293067 A1 | 10/2018 | Hirshberg | |
| 2018/0300472 A1 | 10/2018 | Nakamura et al. | |
| 2018/0321929 A1* | 11/2018 | Persson | H04L 63/123 |
| 2020/0057872 A1* | 2/2020 | Ingraham | H04L 9/085 |

OTHER PUBLICATIONS

Dhawan, Mohan, et al. "Sphinx: detecting security attacks in software-defined networks." Ndss. Vol. 15. 2015.pp. 1-15 (Year: 2015).*

Nilsson, Dennis K., and Ulf E. Larson. "Secure firmware updates over the air in intelligent vehicles." ICC Workshops—2008 IEEE International Conference on Communications Workshops. IEEE, 2008.pp.380-384 (Year: 2008).*

Scott-Hayward, Sandra, Sriram Natarajan, and Sakir Sezer. "A survey of security in software defined networks." IEEE Communications Surveys & Tutorials 18.1 (2015): pp. 623-654. (Year: 2015).*

Conti, Mauro, Denis Donadel, and Federico Turrin. "A survey on industrial control system testbeds and datasets for security research." IEEE Communications Surveys & Tutorials 23.4 (2021): pp. 2248-2294. (Year: 2021).*

Rodriguez, Moises, Mario Piattini, and Christof Ebert. "Software verification and validation technologies and tools." IEEE Software 36.2 (2019): pp. 13-24. (Year: 2019).*

Collberg, Christian, et al. "Distributed application tamper detection via continuous software updates." Proceedings of the 28th Annual Computer Security Applications Conference. 2012. pp. 319-328 (Year: 2012).*

Asokan, N., et al. "ASSURED: Architecture for secure software update of realistic embedded devices." IEEE Transactions on Computer-Aided Design of Integrated Circuits and Systems 37.11 (2018): pp. 2290-2300. (Year: 2018).*

Devanbu, Premkumar, PW-L. Fong, and Stuart G. Stubblebine. "Techniques for trusted software engineering." Proceedings of the 20th international conference on Software engineering. IEEE, 1998. pp. 126-135 (Year: 1998).*

International Search Report corresponding to International Application No. PCT/EP2020/056097, dated Jun. 25, 2020, 4 pages.

Written Opinion corresponding to International Application No. PCT/EP2020/056097, dated Jun. 25, 2020, 6 pages.

Combined Search and Examination Report corresponding to Great Britain Application No. GB1903114.5, dated Sep. 2, 2019, 7 pages.

Combined Search and Examination Report corresponding to Great Britain Application No. GB2003313.0, dated Aug. 27, 2020, 6 pages.

* cited by examiner

VEHICLE CONTROLLER

TECHNICAL FIELD

The present disclosure relates to a vehicle controller and particularly, but not exclusively, to a controller configured to verify the authenticity and integrity of received software for installation on a control unit within a vehicle. Aspects of the invention relate to a verification controller for a vehicle, a method for verifying the authenticity and integrity of received software for installation on a control unit within a vehicle, to a vehicle comprising a controller, to a computer program product and to a computer-readable data carrier, and to a non-transitory computer readable media.

BACKGROUND

Modern automotive vehicles comprise a large number of embedded controllers, such as electronic control units (ECUs), for controlling a wide array of vehicle functions, such as engine management functions, braking functions, cabin climate functions and steering functions. The ECUs are often connected by data buses, which enable the transmission of data between different ECUs. In order to introduce new functionalities or to fix any potential software bugs, the software running on an ECU often needs to be upgraded. As the complexity of vehicle data networks increases, more frequent upgrades to existing ECUs become necessary in order to ensure smooth operation of the vehicle data network.

Traditionally, software updates for vehicle ECUs are introduced into the vehicle data network via hardwired connections from external equipment to the vehicle's communications network. This typically occurs at an authorised garage or dealership where the vehicle may be physically connected to a certified terminal by a certified mechanic who then initiates the software update from the terminal. The use of a certified mechanic using a certified terminal to run the software update ensures the authenticity of the installed software. However, it is desirable to move away from this dependence on a certified mechanic and to improve the versatility with which software updates may take place within a vehicle, including over the air via wireless connections. Within such an environment, verifying the authenticity and integrity of software downloaded to the vehicle becomes even more important as the risk of malicious software being inadvertently downloaded to a vehicle controller, for example via a cellular network, without the vehicle user being aware increases.

With the growth of semi-autonomous vehicles in which ECUs are designed to carry out increasing numbers of tasks which assist and automate vehicle driving functions, the potential damage that could be caused by malicious software increases. If malicious software was installed onto an ECU controlling, for example, the braking response of a vehicle, the consequences could be severe. As we move towards driverless vehicles, it is clear that cybersecurity for vehicles is of utmost importance.

Furthermore, as a larger number of vehicles become wirelessly connected, the potential for cyberattacks aimed at networks of vehicles also increases. It is envisaged, for example, that the wireless connectivity of vehicles may be used in the context of traffic management. The increased communications means available to future vehicles unfortunately also exposes them to greater risk of hacking and their functioning being altered in a way that was not previously possible.

The present invention has been devised to mitigate or overcome at least some of the above-mentioned problems.

SUMMARY OF THE INVENTION

According to an aspect of the present invention there is provided a verification controller for a vehicle, the verification controller configured to verify the authenticity of received software for installation on a control unit within the vehicle. The verification controller may comprise an input arranged in use to receive a data package comprising the software and a first security characteristic associated with an authentic version of the software.

The verification controller may comprise a processor configured in use to generate a second security characteristic in dependence on the received software and to determine if the second security characteristic is consistent with the first security characteristic. The verification controller may comprise an output arranged in use to output a first control signal for the control unit, the first control signal enabling installation of the received software on the control unit in dependence on the second security characteristic being consistent with the first security characteristic.

According to another aspect of the present invention there is provided a verification controller for a vehicle, the verification controller configured to: detect software update data comprising update software being sent to a control unit within the vehicle over the data bus; determine from the software update data a first security characteristic associated with an authentic version of the software; generate a second security characteristic in dependence on the received software update data; determine if the second security characteristic is consistent with the first security characteristic; and output a first control signal for the control unit, the first control signal enabling installation of the software on the control unit in dependence on the second security characteristic being consistent with the first security characteristic.

The verification controller may comprise at least one electronic processor having an electrical input for receiving data being sent over the data bus; and at least one memory device electrically coupled to the at least one electronic processor and having instructions stored therein; and wherein the at least one electronic processor may be configured to access the at least one memory device and execute the instructions thereon so as to: detect software update data comprising update software being sent to a control unit within the vehicle over the data bus; determine from the software update data a first security characteristic associated with an authentic version of the software; generate a second security characteristic in dependence on the received software; determine if the second security characteristic is consistent with the first security characteristic; and output a first control signal for the control unit, the first control signal enabling installation of the software on the control unit in dependence on the second security characteristic being consistent with the first security characteristic.

In certain embodiments, the second security characteristic being consistent with the first security characteristic may require that the security characteristics correspond in a way that is anticipated based on the methods used to generate each security characteristic. In some embodiments, this may require the security characteristics to be identical.

Advantageously, the verification controller provides a way of verifying the authenticity of received software for installation onto a vehicle controller, to prevent fraudulent or malicious software being installed on the vehicle data network. The vehicle user may therefore be safe in the knowledge that their vehicle is protected from cyberattacks. The verification controller additionally provides the advantage of future-proofing vehicles against the risks associated with higher levels of connectivity. For example, as vehicles become increasingly connected, potential concerns may involve the hacking of networks of connected vehicles or the remote control of important functions within increasingly autonomous vehicles. The present invention may help to avert these potentially serious incidents.

In accordance with certain embodiments, the control unit may be one of a plurality of vehicle control units, each vehicle control unit being operatively connected to one of a plurality of data buses within the vehicle. The plurality of data buses may be operatively connected to a shared node, and the verification controller may be comprised at the shared node.

The verification controller may be configured to receive data being sent over the plurality of data buses within the vehicle, each data bus having at least one of the plurality of vehicle control units operatively connected there to.

Advantageously, the verification controller is positioned such that it has oversight of the vehicle data communications network. This has the benefit of enabling the verification controller to intercept incoming software and to check its authenticity, before the software has been installed on the target control unit, providing a further level of security.

In certain embodiments, the verification controller may be comprised at a gateway control module. The gateway control module is a controller configured to manage data transmissions between the different vehicle buses, and may also be configured to receive data from sources external to the vehicle. Furthermore, the gateway control module may be configured to operatively connect the electrical networks associated with different vehicle systems together and to provide an input for the external data to the communications network. Positioning the verification controller at a gateway control module advantageously removes the requirement to add a new controller into the vehicle data network.

In certain embodiments, the verification controller may be arranged to output an alert signal in dependence on the second security characteristic being inconsistent with the first security characteristic. For example, the verification controller may be arranged to output the alert signal to any one of:
 a vehicle display unit;
 an audio system;
 a telematics unit arranged to forward alerts to an external device or user;
 a device located externally to the vehicle;
 a mobile device; and
 an internal vehicle controller.

In this way, advantageously a vehicle operator or technician may be informed when an attempt at installing malicious software on the vehicle has occurred. In certain circumstances, this may be an indication of a wider security threat.

In accordance with certain embodiments, the verification controller may be configured to output a second control signal preventing installation of the software on the control unit in dependence on the second security characteristic being inconsistent with the first security characteristic. The second control signal may comprise instructions for the control unit to delete the software from a memory operatively connected to the control unit. In this way, the malicious software may be expunged from the vehicle data network.

In certain embodiments, the first control signal may comprise instructions instructing the control unit to store the software in a non-volatile memory operatively connected to the control unit in dependence on the second security characteristic being consistent with the first security characteristic.

In accordance with certain embodiments, the verification controller may be configured to output the software to the control unit in dependence on the second security characteristic being consistent with the first security characteristic.

In this way, advantageously, software is only forwarded to the intended target control unit when the verification controller has verified that the software is authentic. Effectively, the received software package is and is therefore essentially quarantined by the verification controller until successful verification occurs. This prevents potentially malicious software from being distributed and stored elsewhere in the automotive data communications network, and provides an easy way to locate and subsequently delete received software if it is determined to be fraudulent.

In certain embodiments, the verification controller may be arranged to output the first control signal in dependence on receipt of a request from the control unit.

In certain embodiments, the verification controller may be arranged to output the software to the control unit in dependence on receipt of the request from the control unit.

In accordance with certain embodiments, the first security characteristic may be a hash generated in dependence on a least a portion of the authentic version of the software, the second security characteristic may be a hash generated in dependence on at least a portion of the received software and the processor may be configured to generate the hash of the received software.

In accordance with certain embodiments, the input may be arranged to receive the data package via any one of a wireless communication channel and a wired communication channel.

In certain embodiments, the processor may be configured to generate the control signal.

In certain embodiments, the received software may relate to at least a portion of a software application.

In accordance with a further aspect of the invention there is provided a method for verifying the authenticity of received software for installation on a control unit within a vehicle. The method may comprise: receiving, at a verification controller, a data package comprising the software and a first security characteristic associated with an authentic version of the software; generating a second security characteristic in dependence on the received software; determining if the second security characteristic is consistent with the first security characteristic; and outputting a first control signal for the control unit, the first control signal enabling installation of the received software on the control unit, in dependence on the second security characteristic being consistent with the first security characteristic.

In accordance with a further aspect of the invention there is provided a method for verifying the authenticity of received software for installation on a control unit within a vehicle, the method comprising: detecting software update data comprising update software being sent to a control unit within the vehicle over a data bus; determining from the software update data a first security characteristic associated with an authentic version of the software; generating a second security characteristic in dependence on the received software update data; determining if the second security characteristic is consistent with the first security characteristic; and outputting a first control signal for the control unit, the first control signal enabling installation of the software on the control unit in dependence on the second security characteristic being consistent with the first security characteristic.

These method aspects of the invention and their embodiments benefit from the same advantages as mentioned in relation to the previous aspect and its embodiment.

In accordance with yet a further aspect of the invention there is provided a vehicle comprising the verification controller of any of the previous aspects of the invention, or configured to carry out the method of any of the previous aspects of the invention.

In accordance with yet a further aspect of the invention there is provided a computer program product comprising instructions, which when executed on a processor, configure the processor to carry out the method of any of the preceding aspects of the invention.

In accordance with yet a further aspect of the invention there is provided a computer-readable data carrier having stored thereon instructions for carrying out the method of any of the previous aspects of the invention.

In accordance with yet a further aspect of the invention there is provided a non-transitory computer-readable media having stored thereon instructions for carrying out the method of any of the previous aspects of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
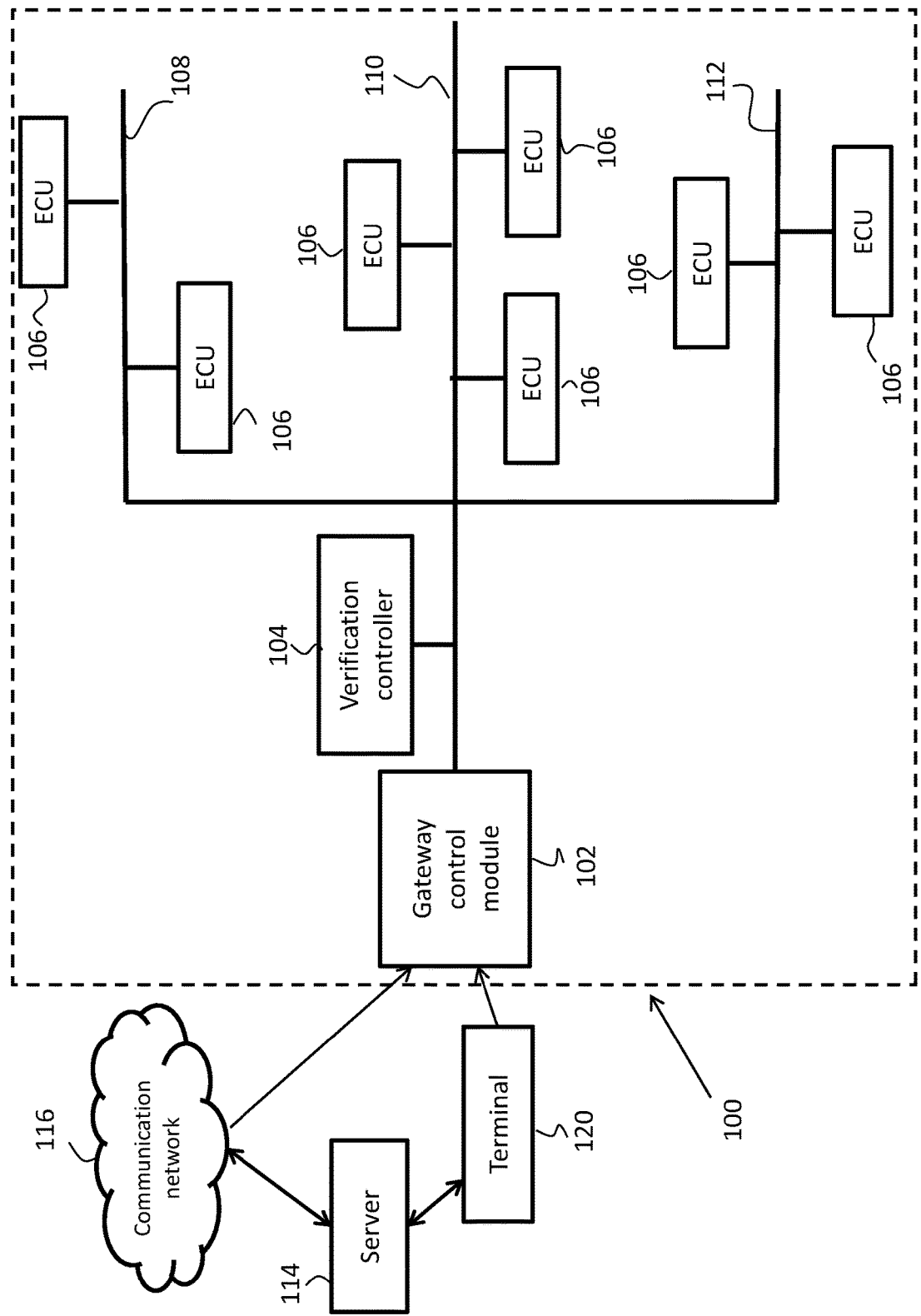
FIG. 1 is a schematic illustration of an automotive communications network comprised within a vehicle operatively connected to a remotely located server and/or terminal, the network comprising a verification controller configured to verify the authenticity of received software.

FIG. 1 is a schematic illustration of an embodiment of the invention in which an automotive communications network 100 comprised within a vehicle 500 (see FIG. 5) is configured to receive software from a source external to the vehicle 500 and to verify the integrity and authenticity of the received software.

For illustrative purposes only, the automotive communications network 100 in FIG. 1 is shown as comprising a gateway control module 102, a verification controller 104 and multiple vehicle controllers which may also be referred to as Electronic Control Units (ECUs) 106. An ECU 106 is an embedded controller which may control one or more electrical systems within the vehicle 500. Each ECU 106 may receive data from sensors within the vehicle 500 and be operatively connected to actuators within the vehicle. Data may be exchanged between ECUs 106 via a data bus. Each ECU 106 may comprise processing means for executing instructions stored in memory operatively connected to the ECU 106.

The ECUs 106 within the automotive communications network 100 may be operatively connected via data buses 108, 110, 112. Within the present context, a data bus is a communications channel that operatively connects components within a vehicle in accordance with a bus protocol such as CAN, Flexray or Ethernet. For illustrative purposes only, the automotive communications network 100 is shown to have three data buses 108, 110, 112, but it is to be appreciated that the network 100 may comprise any number of data buses connecting different vehicle components.

The automotive communications network 100 is arranged to receive data from a server 114 over a wireless communications network 116 or via a terminal 120. The server 114 is located externally to the vehicle 500, and may comprise storage containing a data package to be transmitted to the automotive communications network 100 of the vehicle 500. The data package may comprise software to be installed on a vehicle ECU 106 comprised within the automotive communications network 100. The software to be installed on a target ECU 106 within the vehicle may be software enabling new functionality or correcting bugs within previous versions of software installed on the ECU, for example. In an embodiment, the software may relate to an application for installation on the target ECU 106. In an embodiment, the application may be transmitted to the vehicle communications network 100 in several stages, wherein at each stage a portion of the software application is transmitted. In this way a software application may be downloaded and/or installed in stages. The data package may comprise a security characteristic associated with the authentic software to be installed on the ECU 106.

In an embodiment, the security characteristic may be a cryptograph hash, message authentication code (MAC) or other such one way functions generated in dependence on at least a portion of the authentic software which may be generated by applying a cryptographic hash function to the authentic software. The security characteristic may be generated by a processor operatively connected to the server 114.

In certain embodiments, the authentic software and the security characteristic may be encrypted using known cryptographic protocols. This may comprise signing using a private key of a cryptographic key pair. The use of cryptographic key pairs enables the integrity of the received software to be determined. The cryptographic key may be stored on the external server 114 and the authentic software and security characteristic may be signed by a processor operatively connected to the server 114, prior to being sent to the automotive communications network 100.

The software for installation on the vehicle ECU 106 may be received by the automotive communications network 100 at the gateway control module 102. In addition to monitoring and controlling data transmitted between the various vehicle buses 108, 110, 112, the gateway control module 102 may be configured to receive data via either hard-wired or wireless communication means. The gateway control module 102 may be operatively connected to all data buses 108, 110, 112 within the automotive communication network 100. In certain embodiments, all data received by the automotive communication network 100 is received by the gateway control module 102.

In some embodiments, the gateway control module may be configured to receive data over the air, for example via a wireless communications network 116 such as a mobile communications network or a Wi-Fi network. The data package may be sent from the server 114 to the gateway control module 102 via the shared communications network 116. For example, a software update for a particular ECU 106 may be downloaded to the gateway control module 102 via a Wi-Fi connection in an automotive garage or a licensed dealership. A software download may also take place over a mobile communications network. The download may be initiated remotely, for example by a vehicle dealership.

The gateway control module 102 may also be configured to receive the data package via a hardwired connection. The server 114 may be connected to a terminal 120 which may relate to, for example, a computer. A hardwired connection, such as an Ethernet connection, from the terminal 120 to the vehicle 500 may be provided, and downloading of the data package may be initiated, for example by a mechanic operating the computer. In this way, the data package may be downloaded to the gateway control module 102 of the vehicle 500 via the hardwired connection.

Once the gateway control module 102 has received the data package, the module 102 may be configured to identify the intended recipient ECU 106. The data package may then be forwarded from the gateway control module 102 to the verification controller 104 for verification.

The software to be installed on the target ECU 106 may be forwarded to the ECU 106 prior to the verification process occurring, or after the verification process has occurred. In an embodiment, the ECU 106 may be operatively connected to a volatile storage means and to a non-volatile storage means. When the ECU 106 receives software which has not yet been verified, the ECU 106 may store the software in the volatile storage means. Alternatively, if the ECU 106 receives verified software, the ECU 106 may store the software in the non-volatile storage means. Various embodiments will be described in greater detail in the ensuing description.

The verification controller 104 may relate to an embedded controller which may be configured to carry out the verification process on the received software to determine whether the received software is authentic. The verification controller 104 may be located at a network node to which all data buses 108, 110, 112 within the automotive communications network 100 are operatively connected. Any downloaded software being forwarded from the gateway control module 102 to the target ECU 106 therefore passes the verification controller 104, before reaching the intended target ECU 106.

In some embodiments, the verification controller 104 may be comprised at the gateway control module 102. In this way, the present embodiment may be implemented using existing vehicle hardware.

In an embodiment, the verification controller 104 may be comprised within any existing ECU 106 located within the automotive data communications network 100, provided that the ECU 106 is configured such that data received by the gateway control module 102 is also made available to the ECU 106 in question prior to installation on the intended target ECU 106.

The verification controller 104 may be configured to carry out a verification process on the received software and received verification characteristic. The verification process may comprise carrying out one or more cryptographic checks on the received data package. In dependence on the verification process confirming that the received software is authentic, the verification controller 104 may output a control signal enabling the intended target ECU to install the received software. Further details will be provided in the ensuing description.

If instead the verification process confirms that the received software is not authentic, the verification controller 104 may instead output a control signal preventing the installation of the software on any ECU comprised within the vehicle.

Figure 2:
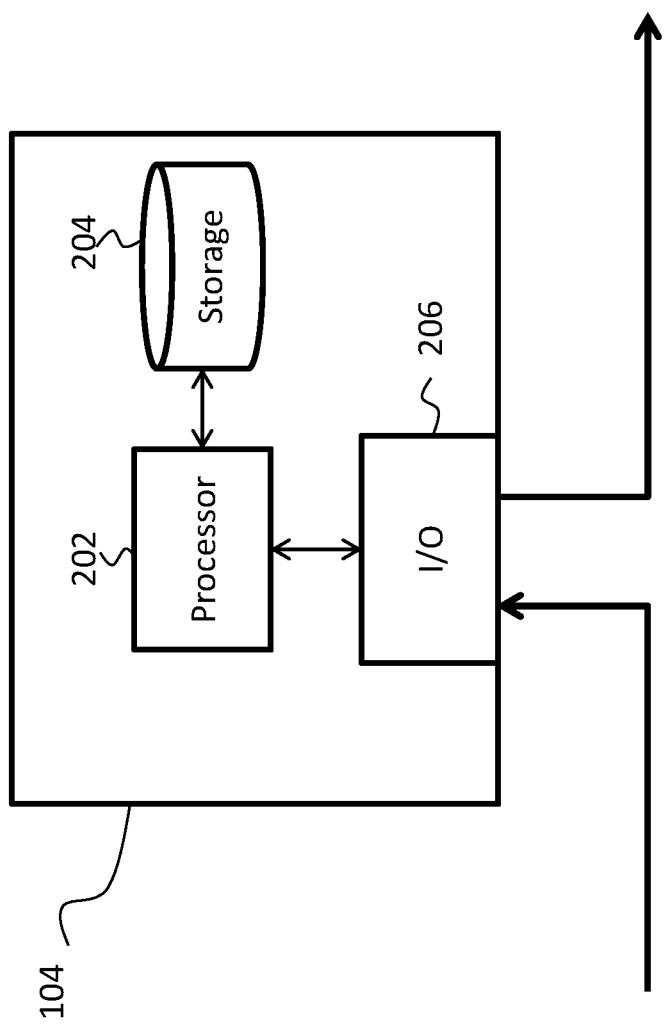
FIG. 2 is a schematic diagram of the verification controller of FIG. 1.

FIG. 2 is a schematic illustration of the functional components of the verification controller 104.

The verification controller 104 may comprise a processor 202, storage 204 and an input/output (I/O) 206. Input/output 206 may be configured to receive the data package via a communications channel shared with the gateway control module 102. The I/O 206 may also be configured to output a signal to any controller connected to any of the data buses 108, 110, 112 within the automotive communications network 100.

The processor 202 may be configured to carry out the verification process on the received software. As previously mentioned, the verification process may comprise carrying out one or more cryptographic checks on the received software and outputting at least one control signal, the control signal being dependent on the result of the verification process.

Figure 3A:
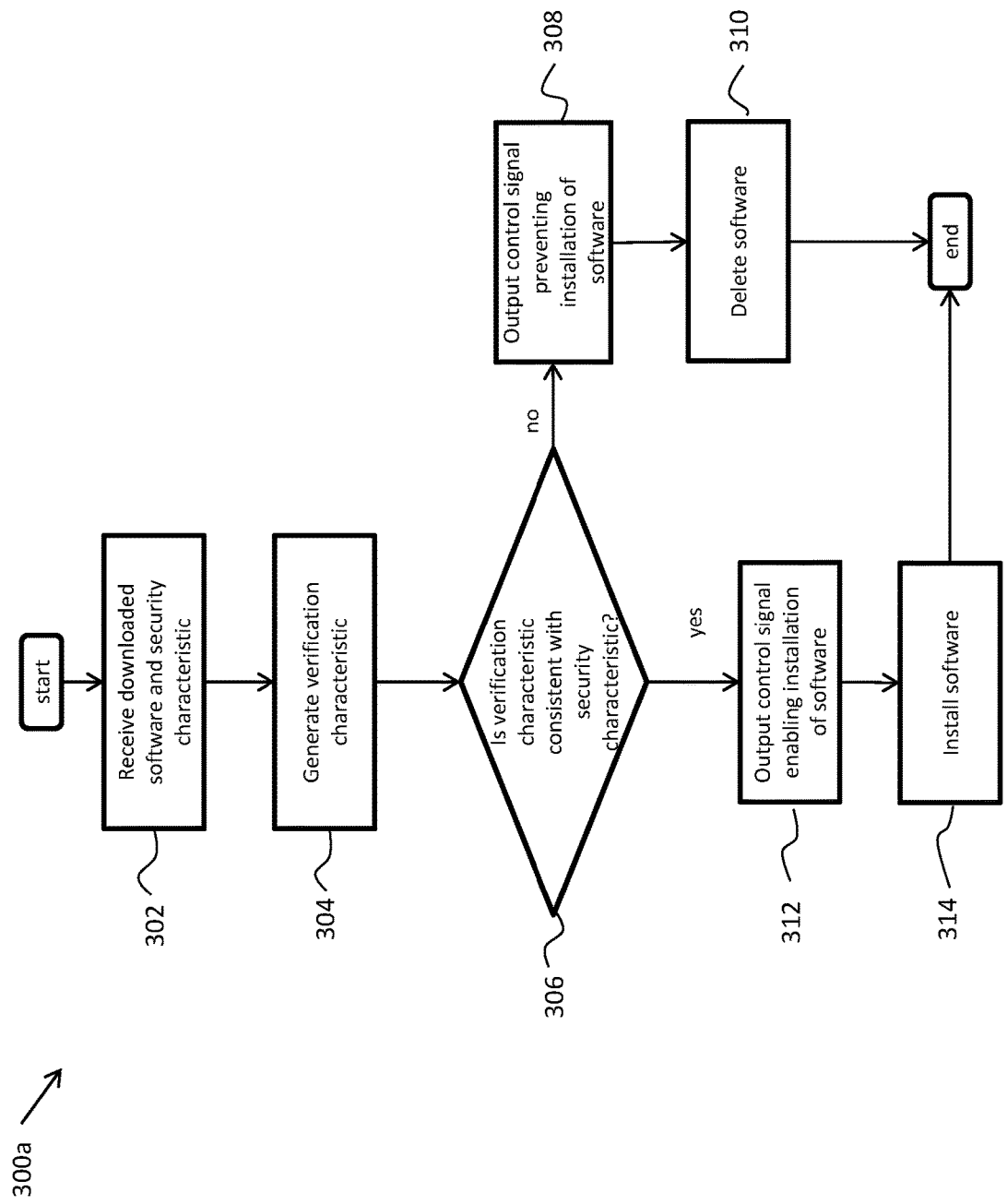
FIG. 3a is a flow chart outlining an example of the verification process which may be carried out by the verification controller of FIGS. 1 and 2 and a vehicle control unit to which the software is to be downloaded.

FIG. 3a is a flow chart 300a showing one example of the verification process carried out by the verification controller 104, in accordance with an embodiment of the invention.

At 302, the verification controller 104 receives, at the I/O 206, the received software and security characteristic comprised within the received data package.

Where the encrypted data package has been signed using a private key in a public-key cryptographic protocol, upon receipt, the verification controller 104 may recover the data package using the public key counterpart. There is therefore provided an extra level of security that the received software has been sent by a verified sender, i.e. a holder of the private key of the cryptographic key pair.

At 304, the processor 202 generates a second security characteristic in dependence on the received software based on instructions stored in storage 204. For clarity, the second security characteristic will be referred to as the verification characteristic in the ensuing description.

The verification characteristic may be generated using the same method used by the server 114 to generate the security characteristic. In an embodiment, the verification characteristic may be generated using a cryptographic algorithm. For example, the verification characteristic may be a hash of at least a portion of the received software.

At 306, the verification controller 104 determines whether the generated verification characteristic is consistent with the received security characteristic. Where the security characteristic is a hash (or other one way function) generated in dependence on at least a portion of the authentic software and the verification characteristic is a hash generated in dependence on at least a portion of the received software, consistent refers to the hashes of the authentic software and the received software being identical. The two hashes will only be identical in the case in which the private and public key belong to the same key pair and in which software that the cryptographic hash function was applied to is identical. If these two criteria are met, there is a high level of certainty that the software was sent from an authorised source and that the software is the authentic version of the software from the authorised source. The verification process thereby enables the integrity and authenticity of the received software to be verified.

In other embodiments, the security characteristic being consistent with the verification characteristic may refer to the verification characteristic corresponding to what is anticipated based on the received security characteristic. The security characteristic and verification characteristic therefore may not be required to be identical, but may instead relate to each other in a different, predetermined manner in dependence on the cryptographic protocol used.

If the verification characteristic is found to be inconsistent with the security characteristic, the process proceeds to 308 in which the verification controller outputs a control signal preventing installation of the software on the target ECU 106.

In an embodiment, the output may also comprise an alert which notifies the automotive communication network and/or a user that the verification has failed. The alert may be sent to other devices either internal to or external to the vehicle, for example a vehicle display unit, an audio system within the vehicle, a telematics unit arranged to forward alerts to an external device or user, a vehicle controller, or directly to a device located externally to the vehicle, such as a mobile device. Advantageously, the person, for example the mechanic, providing the software update may therefore immediately be aware of the failed verification process and take steps to determine the source of the fraudulent software.

In an embodiment, the alert may be output to the terminal 120, for example to notify a mechanic that the software update to the vehicle 500 has failed. The alert may contain information identifying the origin of the software and the target ECU 106. In an embodiment, the alert may be sent to the server 114, either via the terminal 120 or communications network 116, to be stored such that a record of the incident may be maintained, for example in a database.

Where the target ECU 106 has already received the software, the output may comprise a control signal to the ECU 106 instructing the ECU 106 to delete the received software from memory. At 310 the software download is deleted by the target ECU 106.

If at 306 the verification characteristic is found to be consistent with the security characteristic, the process proceeds to 312, in which the verification controller 104 outputs a control signal enabling installation of the software on the target ECU 106.

In an embodiment, where the ECU 106 has already received and stored the software, the output may comprise a control signal sent to the ECU 106 which instructs the ECU 106 commence the software installation.

At 314, the ECU 106 may install the received software. In an embodiment, the ECU 106 may move the software from volatile storage operatively connected to the ECU 106 to non-volatile storage operatively connected to the ECU 106.

If the ECU 106 has not yet received the software, the verification controller 104 may output the received software to the ECU 106 with the control signal instructing the ECU 106 to commence the software installation.

Figure 4:
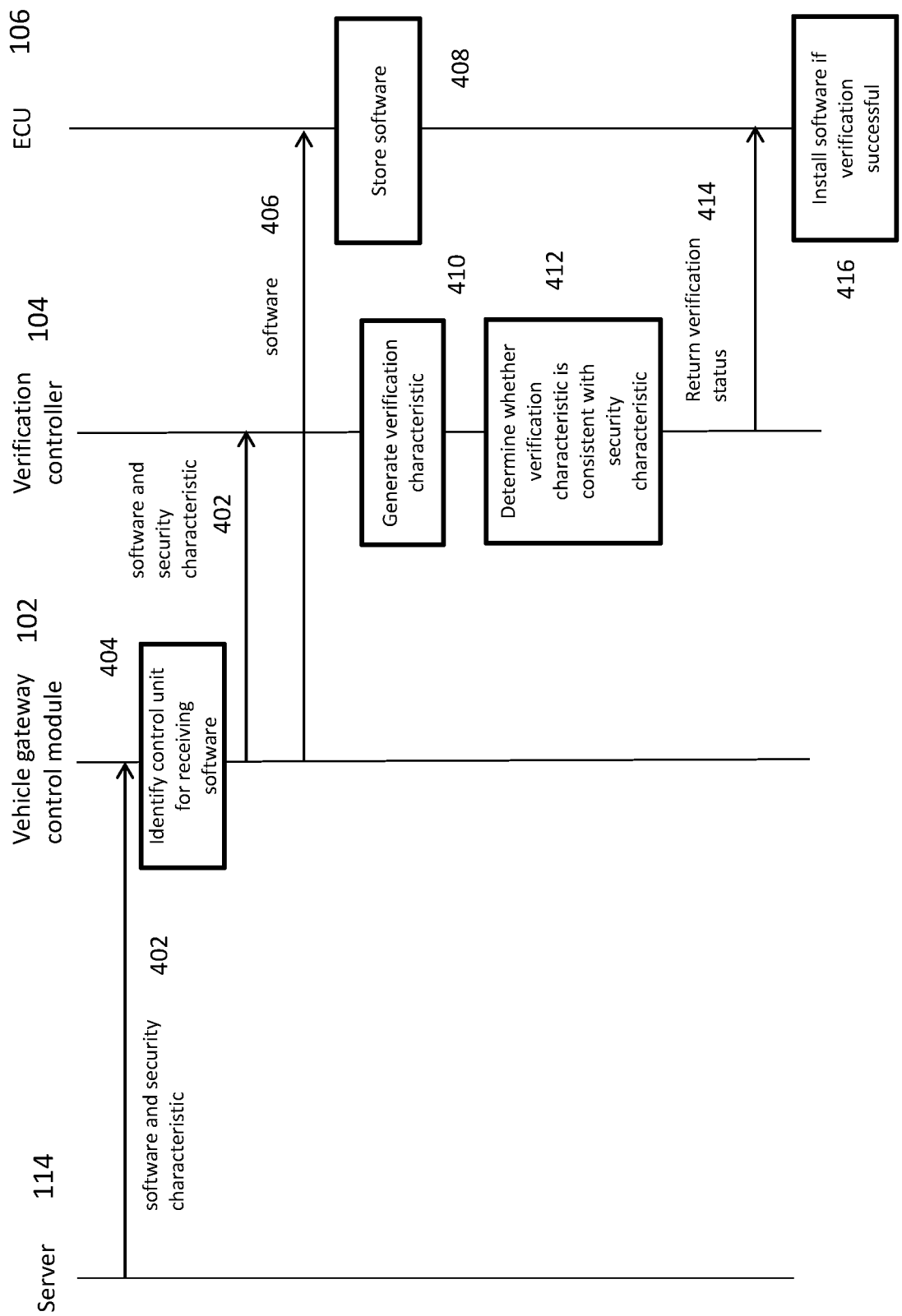
FIG. 4 is a data flow chart illustrating the flow of data messages in an exemplary implementation of the methods of FIGS. 3a and 3b, carried out by the system of FIG. 1.

FIG. 4 is a data flow chart which further illustrates the data flow from the server 114 through the automotive communications network 100, in accordance with an embodiment.

Firstly, the data package 402 comprising the software and security characteristic is sent from the server 114, located externally to the vehicle, to the vehicle gateway control module 102. As described above, the data package may be sent via a hard-wired or wireless connection.

Upon receiving the data package 402, the vehicle gateway control module 102 identifies the target ECU 106 the software is intended for at 404. The gateway control module 102 may then send the data package to the verification controller 104.

The gateway control module 102 may also send the software 406 to the target ECU 106 via the relevant data buses 108, 110, 112. Upon receiving the software 406, the target ECU 106 may store the software 406, at 408. In some embodiments, the ECU 106 stores the received software 406 in volatile storage operatively connected to the ECU 106. In this way, the received software is not permanently stored within the ECU's storage 204. This may provide an extra layer of security to the verification process. For example, if power to the ECU 106 is turned off whilst the verification process is being undertaken, the received software would be deleted from the memory. In this way, the risk of unverified software being permanently stored on a vehicle ECU 106 is reduced.

Meanwhile, the verification controller 104 may generate a verification characteristic at 410, corresponding to 304 of FIG. 3 as has been described above. At 412, the verification controller may determine whether the verification characteristic is consistent with the security characteristic, corresponding to 306 of FIG. 3, as has been described above. At 414, the verification controller sends the verification status to the ECU 106 via the necessary data buses 108, 110, 112, corresponding to 308 and 312 of FIG. 3.

At 416, the ECU 106 installs the software if the verification status indicates that the verification was successful. The ECU 106 may additionally store the software in non-volatile memory operatively connected to the ECU 106, such that the software is permanently stored in memory operatively connected to the ECU 106.

In an embodiment, the gateway control module 102 may send the data package 402 to the verification controller 104, but may refrain from sending the software 406 to the target ECU 106. In this embodiment, the verification controller may output the software to the ECU in dependence on the security characteristic being consistent with the verification characteristic, i.e. on the verification being successful.

In an embodiment, the verification controller 104 may be configured to monitor the data buses 108, 110, 112 to detect any data corresponding to software updates being sent to any ECU 106 via the data buses 108, 110, 112. The gateway control module 102 may be configured to send the received software directly to the target ECU 106 without sending the data package 402 to the verification controller 104.

Upon detection of a data package identified by the verification controller as corresponding to a data package comprising software to be installed on a target ECU 106, the verification controller 104 may intercept this data package.

As the security characteristic may not be sent to the target ECU 106, the verification controller 104 may send a request via the data bus 110 to the gateway control module 102 for the security characteristic corresponding to the intercepted software 406.

Figure 3B:
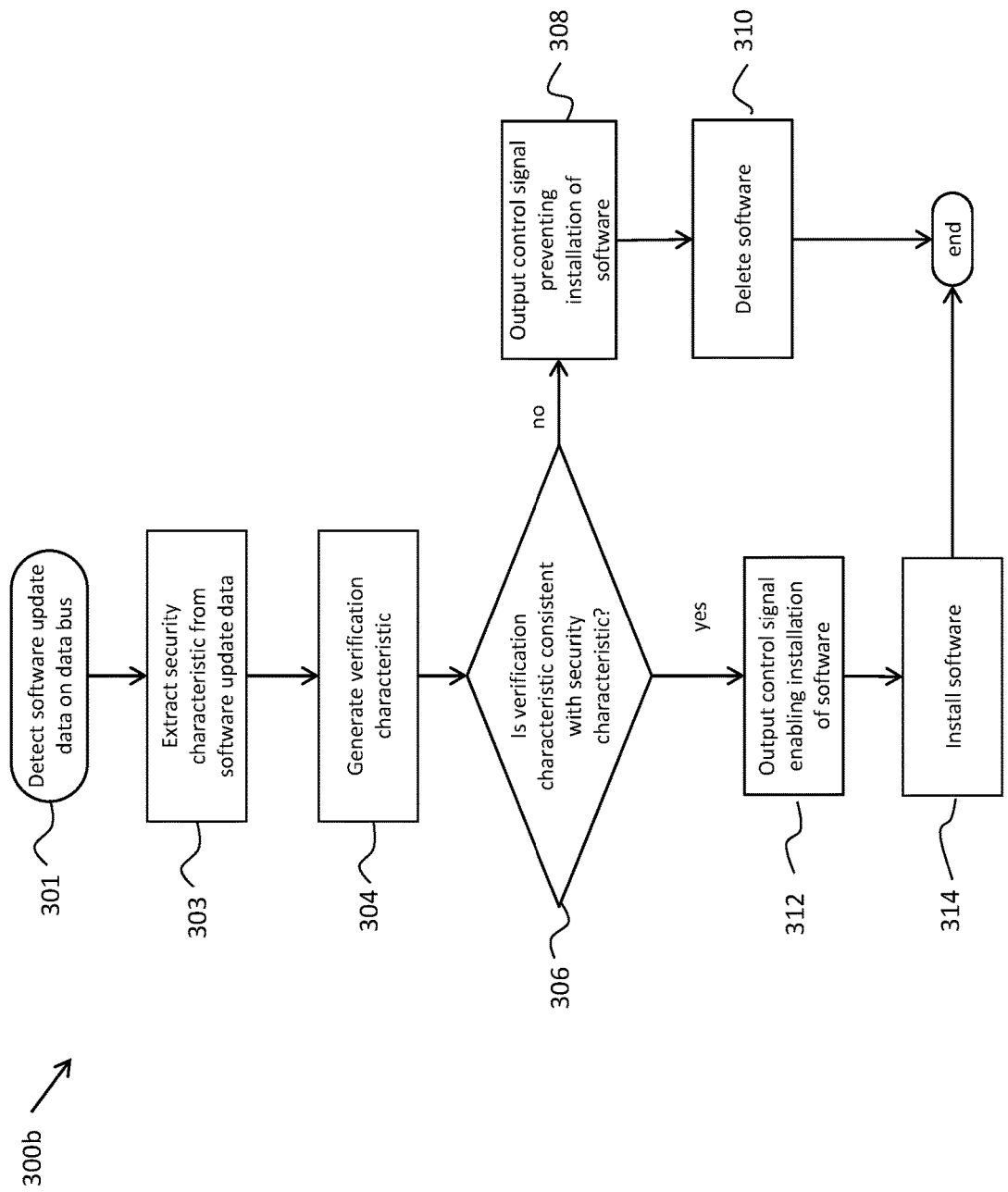
FIG. 3b is a flow chart outlining an alternative example of the verification process which may be carried out by the verification controller of FIGS. 1 and 2 and a vehicle control unit to which the software is to be downloaded.

FIG. 3*b* is a flow chart 300*b* showing an alternative example of the verification process carried out by the verification controller 104, in accordance with an embodiment of the invention.

In this example, the method starts at 301 upon detection of software update data being sent over one or more of the data buses 108, 110, 112.

At 303, a first security characteristic is extracted or otherwise obtained from the software update data.

At 304, the processor 202 generates a second security characteristic in dependence on the received software based on instructions stored in storage 204. For clarity, the second security characteristic will be referred to as the verification characteristic in the ensuing description.

The verification characteristic may be generated using the same method used by the server 114 to generate the security characteristic. In an embodiment, the verification characteristic may be generated using a cryptographic algorithm. For example, the verification characteristic may be a hash of at least a portion of the received software.

At 306, the verification controller 104 determines whether the generated verification characteristic is consistent with the received security characteristic. Where the security characteristic is a hash (or other one way function) generated in dependence on at least a portion of the authentic software and the verification characteristic is a hash generated in dependence on at least a portion of the received software, consistent refers to the hashes of the authentic software and the received software being identical. The two hashes will only be identical in the case in which the private and public key belong to the same key pair and in which software that the cryptographic hash function was applied to is identical. If these two criteria are met, there is a high level of certainty that the software was sent from an authorised source and that the software is the authentic version of the software from the authorised source. The verification process thereby enables the integrity and authenticity of the received software to be verified.

In other embodiments, the security characteristic being consistent with the verification characteristic may refer to the verification characteristic corresponding to what is anticipated based on the received security characteristic. The security characteristic and verification characteristic therefore may not be required to be identical, but may instead relate to each other in a different, predetermined manner in dependence on the cryptographic protocol used.

If the verification characteristic is found to be inconsistent with the security characteristic, the process proceeds to 308 in which the verification controller outputs a control signal preventing installation of the software on the target ECU 106.

In an embodiment, the output may also comprise an alert which notifies the automotive communication network and/or a user that the verification has failed. The alert may be sent to other devices either internal to or external to the vehicle, for example a vehicle display unit, an audio system within the vehicle, a telematics unit arranged to forward alerts to an external device or user, a vehicle controller, or directly to a device located externally to the vehicle, such as a mobile device. Advantageously, the person, for example the mechanic, providing the software update may therefore immediately be aware of the failed verification process and take steps to determine the source of the fraudulent software.

In an embodiment, the alert may be output to the terminal 120, for example to notify a mechanic that the software update to the vehicle 500 has failed. The alert may contain information identifying the origin of the software and the target ECU 106. In an embodiment, the alert may be sent to the server 114, either via the terminal 120 or communications network 116, to be stored such that a record of the incident may be maintained, for example in a database.

Where the target ECU 106 has already received the software, the output may comprise a control signal to the ECU 106 instructing the ECU 106 to delete the received software from memory. At 310 the software download is deleted by the target ECU 106.

If at 306 the verification characteristic is found to be consistent with the security characteristic, the process proceeds to 312, in which the verification controller 104 outputs a control signal enabling installation of the software on the target ECU 106.

In an embodiment, where the ECU 106 has already received and stored the software, the output may comprise a control signal sent to the ECU 106 which instructs the ECU 106 commence the software installation.

At 314, the ECU 106 may install the received software. In an embodiment, the ECU 106 may move the software from volatile storage operatively connected to the ECU 106 to non-volatile storage operatively connected to the ECU 106.

If the ECU 106 has not yet received the software, the verification controller 104 may output the received software to the ECU 106 with the control signal instructing the ECU 106 to commence the software installation.

In an embodiment, the target ECU 106 may send a query to the verification controller 104 to request the verification status 414. If the ECU 106 has already received the software and has the software stored, the ECU 106 may wait for confirmation from the verification controller that the verification was successful before commencing the installation of the received software. In an embodiment, the ECU 106 may first move the software from volatile memory to non-volatile memory before commencing the software installation.

If the target ECU 106 has not already received the software, the query may request that the software 406 be sent from the verification controller 104 to the ECU 106 if the verification controller determines that the software is authentic, i.e. that the verification was successful.

Figure 5:
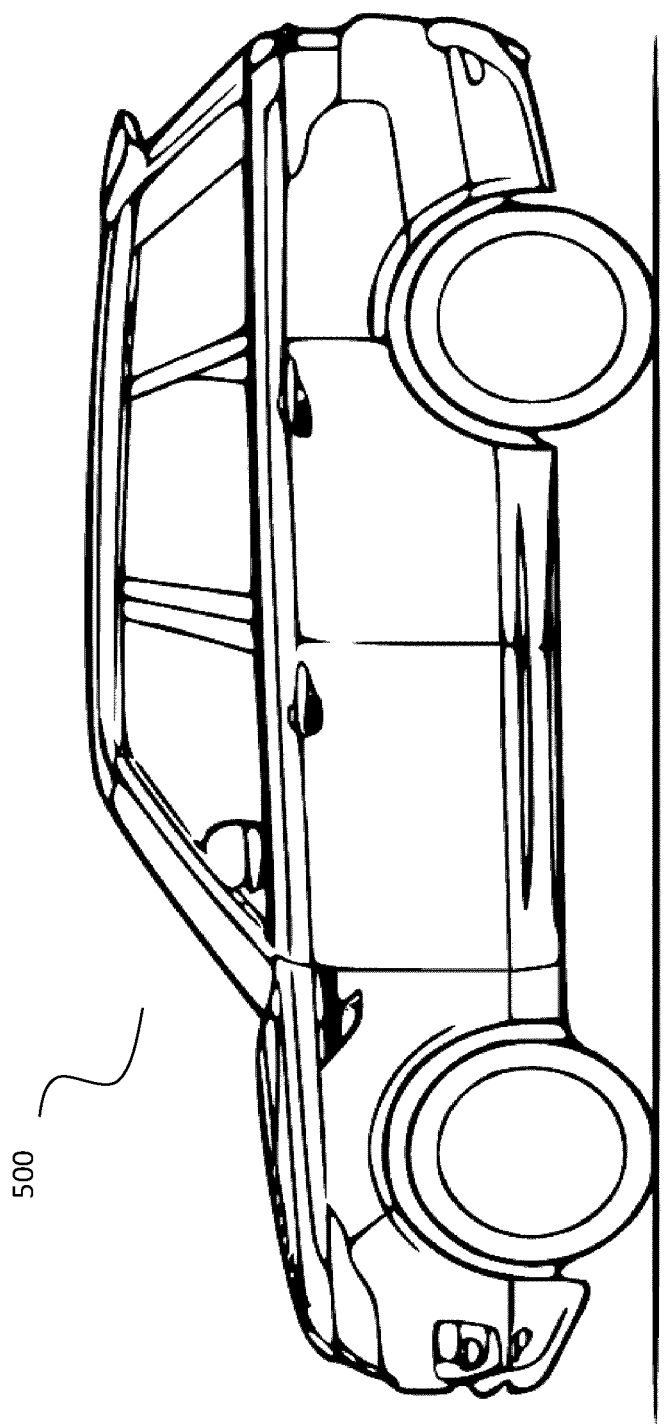
FIG. 5 is a schematic illustration of a vehicle comprising the automotive communications network of FIG. 1.

FIG. 5 is a schematic illustration of a vehicle 500, the vehicle 500 comprising the automotive communications network 100 including the herein described verification controller.

Many modifications may be made to the above examples without departing from the scope of the present invention as defined in the accompanying claims.

The invention claimed is:

1. A verification controller, embedded within a vehicle and comprising at least one processor that, when executed, the verification controller is configured to:
    verify authenticity of received software for installation on at least one of a plurality of control units within the vehicle, the plurality of control units being separate to the verification module;
    detect software update data on a data bus of the vehicle, the software update data comprising update software being sent to any of the plurality of control units within the vehicle over a data bus, the control unit being separate to the verification controller that is used for checking the authenticity of the received software, and upon detection of software update data comprising update software being sent to at least one of the plurality of vehicle control units:
  determine from the detected software update data a first security characteristic associated with an authentic version of the software;
  generate a second security characteristic in dependence on the received software update data;
  determine if the second security characteristic is consistent with the first security characteristic; and
  output a first control signal for the at least one of the plurality of vehicle control units, the first control signal enabling installation of the received software on the at least one of the plurality of vehicle control units in dependence on the second security characteristic being consistent with the first security characteristic.

2. The verification controller of claim 1, wherein the
at least one electronic processor has an electrical input for receiving data being sent over the data bus; and
wherein the verification controller comprises at least one memory device electrically coupled to the at least one electronic processor and having instructions stored therein;
and wherein the at least one electronic processor is configured to access the at least one memory device and execute the instructions thereon so as to:
detect software update data comprising update software being sent to any of the plurality of vehicle control units within the vehicle over the data bus;
determine from the software update data a first security characteristic associated with an authentic version of the software;
generate a second security characteristic in dependence on the received software update data;
determine if the second security characteristic is consistent with the first security characteristic; and
output a first control signal for the at least one of the plurality of vehicle control units, the first control signal enabling installation of the software on the at least one of the plurality of vehicle control units in dependence on the second security characteristic being consistent with the first security characteristic.

3. The verification controller of claim 1, wherein the verification controller is configured to receive data being sent over a plurality of data buses within the vehicle, each data bus having at least one of the plurality of vehicle control units operatively connected there to.

4. The verification controller of claim 1, wherein the verification controller is comprised at a gateway control module.

5. The verification controller of claim 1, wherein the verification controller is arranged to output an alert signal in dependence on the second security characteristic being inconsistent with the first security characteristic.

6. The verification controller of claim 1, wherein the verification controller is configured to output a second control signal preventing installation of the software on the at least one of the plurality of vehicle control units in dependence on the second security characteristic being inconsistent with the first security characteristic.

7. The verification controller of claim 1, wherein the verification controller is arranged to output the first control signal in dependence on receipt of a request from the at least one of the plurality of vehicle control units.

8. A vehicle comprising the verification controller of claim 1.

9. The verification controller of claim 1, wherein at least one of the first security characteristic and the second security characteristic is one of a cryptograph hash or message authentication code (MAC).

10. The verification controller of claim 9, wherein the authentic version of the software and the at least one security characteristic are encrypted using cryptographic protocols.

11. A method for verifying the authenticity of received software for installation on a control unit within a vehicle, using a verification module embedded within the vehicle, the method comprising:
  verifying authenticity of received software for installation on at least one of a plurality of control units within the vehicle, the plurality of control units being separate to the verification module;
  detecting, using the verification module, software update data on a data bus of the vehicle, the software update data comprising update software being sent to any of the plurality of vehicle control units within the vehicle the control unit being separate to the verification controller that is used for checking the authenticity of the received software, and
  upon detection of software update data comprising update software being sent to at least one of the plurality of vehicle control units:
    determining, using the verification module, from the detected software update data a first security characteristic associated with an authentic version of the software;
    generating, using the verification module, a second security characteristic in dependence on the received software update data;
    determining, using the verification module, if the second security characteristic is consistent with the first security characteristic; and
    outputting, from the verification module, a first control signal for the at least one of the plurality of vehicle control units, the first control signal enabling installation of the software on the at least one of the plurality of vehicle control units in dependence on the second security characteristic being consistent with the first security characteristic.

12. A vehicle having stored therein computer software that, when executed, is arranged to perform the method of claim 11.

13. A non-transitory, computer-readable storage medium storing instructions thereon that, when executed by one or more electronic processors, causes the one or more electronic processors to carry out the method of claim 11.

14. The method of claim 11, wherein at least one of the first security characteristic and the second security characteristic is one of a cryptograph hash or message authentication code (MAC).

15. The method of claim 14, wherein the authentic version of the software and the at least one security characteristic are encrypted using cryptographic protocols.

16. A verification controller for a vehicle, embedded within a vehicle and comprising at least one processor that, when executed, the verification controller is configured to:
  detect software update data on a data bus of the vehicle, the software update data comprising update software being sent to a control unit within the vehicle, the control unit being separate to the verification controller that is used for checking the authenticity of the update software;

determine from the detected software update data a first security characteristic associated with an authentic version of the software;

generate a second security characteristic in dependence on the received software update data;

determine if the second security characteristic is consistent with the first security characteristic; and output a first control signal for the control unit, the first control signal enabling installation of the received software on the control unit in dependence on the second security characteristic being consistent with the first security characteristic.

17. The verification controller of claim 16, wherein at least one of the first security characteristic and the second security characteristic is one of a cryptograph hash or message authentication code (MAC).

18. The verification controller of claim 17, wherein the authentic version of the software and the at least one security characteristic are encrypted using cryptographic protocols.

* * * * *